United States Patent
Tsuneki et al.

(10) Patent No.: US 11,531,316 B2
(45) Date of Patent: Dec. 20, 2022

(54) MOTOR CONTROLLER WITH PREPROCESSING OF A COMMAND VALUE

(71) Applicant: FANUC CORPORATION, Yamanashi (JP)

(72) Inventors: Ryoutarou Tsuneki, Yamanashi (JP); Satoshi Ikai, Yamanashi (JP); Yao Liang, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 296 days.

(21) Appl. No.: 16/892,030

(22) Filed: Jun. 3, 2020

(65) Prior Publication Data

US 2021/0008678 A1      Jan. 14, 2021

(30) Foreign Application Priority Data

Jul. 10, 2019  (JP) .............................. JP2019-128296

(51) Int. Cl.
  *G05B 19/23*     (2006.01)
  *G05B 19/404*    (2006.01)
(52) U.S. Cl.
  CPC ......... *G05B 19/234* (2013.01); *G05B 19/404* (2013.01)
(58) Field of Classification Search
  CPC .................................................. G05B 19/234

USPC ............................................................ 173/2
See application file for complete search history.

(56) References Cited

U.S. PATENT DOCUMENTS

2015/0346381 A1* 12/2015 Donderici ............. E21B 47/022
                                                      702/6
2018/0052449 A1*  2/2018 Nakamura ......... G05B 19/4163

FOREIGN PATENT DOCUMENTS

JP         2017-175890 A     9/2017

* cited by examiner

*Primary Examiner* — Jigneshkumar C Patel
(74) *Attorney, Agent, or Firm* — Studebaker & Brackett PC

(57) ABSTRACT

A motor controller includes: a command unit which outputs a command value for controlling a motor that drives a driven unit; a motor control unit which controls the motor based on the command value; a compensation filter which compensates for the command value; and a preprocessing unit which is provided in a stage preceding the compensation filter, the compensation filter has a frequency region in which a gain is greater than 1 and the preprocessing unit executes, when a variation in the command value before being compensated for with the compensation filter is equal to or less than a predetermined value, preprocessing in which a past command value is used as a current command value.

2 Claims, 4 Drawing Sheets

MOTOR CONTROLLER WITH PREPROCESSING OF A COMMAND VALUE

This application is based on and claims the benefit of priority from Japanese Patent Application No. 2019-128296, filed on 10 Jul. 2019, the content of which is incorporated herein by reference.

BACKGROUND OF THE INVENTION

Field of the Invention

The present invention relates to motor controllers.

Related Art

Conventionally, a technology is known in which in a motor controller controlling a motor that drives a driven unit such as an industrial machine, an inverse characteristic filter for a transmission characteristic from the motor up to a machine or the like is used so as to compensate for a command value (see, for example, Patent Document 1).
Patent Document 1: Japanese Unexamined Patent Application, Publication No. 2017-175890

SUMMARY OF THE INVENTION

When in such a motor controller, a compensation filter has a filter characteristic which raises a gain in, for example, a specific frequency region, it is likely that in the specific frequency region, a small variation in the command value caused by discretization processing or the like is amplified and that consequently, vibrations or an unusual sound occurs in the driven unit of the machine which is controlled with the command value. In an industrial machine or the like, it is desired to prevent the occurrence of such vibrations or an unusual sound.

A motor controller according to one aspect of the present disclosure includes: a command unit which outputs a command value for controlling a motor that drives a driven unit; a motor control unit which controls the motor based on the command value; a compensation filter which compensates for the command value; and a preprocessing unit which is provided in a stage preceding the compensation filter, the compensation filter has a frequency region in which a gain is greater than 1 and the preprocessing unit executes, when a variation in the command value before being compensated for with the compensation filter is equal to or less than a predetermined value, preprocessing in which a past command value is used as a current command value.

In the motor controller according to the one aspect, even when the compensation filter which compensates for the command value has a filter characteristic that raises a gain in a specific frequency region, a small variation in the command value is prevented from being amplified, with the result that it is possible to prevent the occurrence of vibrations or an unusual sound in the driven unit.

DETAILED DESCRIPTION OF THE INVENTION

Figure 1:
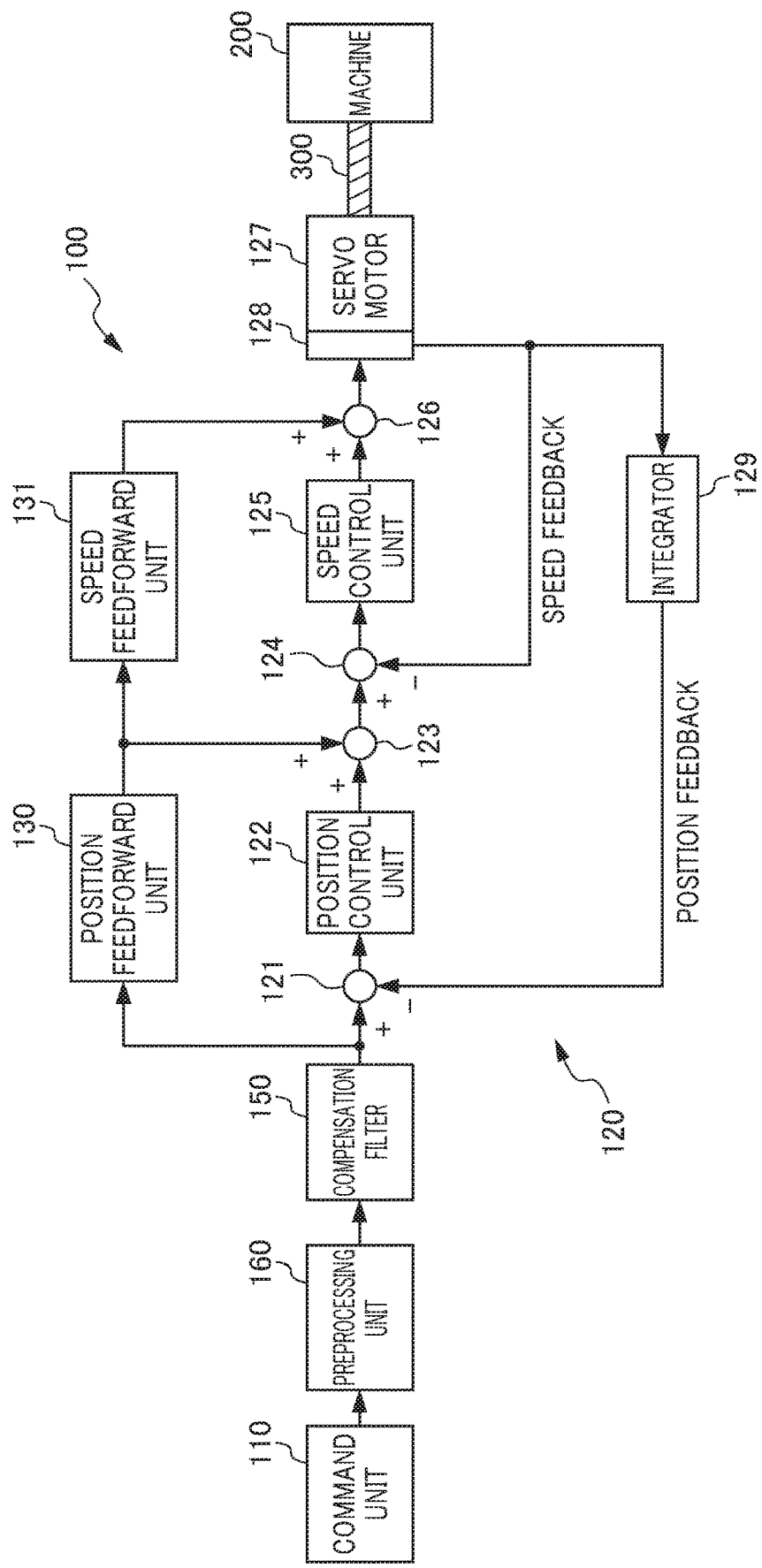
FIG. 1 is a block diagram showing an embodiment of a motor controller.

An embodiment of a motor controller in the present disclosure will be described below with reference to drawings. FIG. 1 is a block diagram showing the embodiment of the motor controller.

As shown in FIG. 1, the motor controller 100 includes a command unit 110, a motor control unit 120, a compensation filter 150 and a preprocessing unit 160. FIG. 1 shows a machine 200 serving as a driven unit which is driven with the motor controller 100. As the machine 200 serving as the control target of the motor controller 100, for example, a machine tool can be mentioned. However, the control target of the motor controller 100 is not limited to the machine tool, and may be, for example, an industrial machine or the like other than the machine tool. Examples of the industrial machine include a machine tool, an industrial robot and other machines (including various machines such as a service robot, a forging machine and an injection molding machine). The motor controller 100 may be provided as part of the industrial machine or the like.

The command unit 110 outputs a position command value as a command value for controlling a servo motor 127 which serves as a motor that drives the machine 200. The command unit 110 generates a position command according to a program or a command which is input from a higher level control device serving as an unillustrated higher level controller, an external input device or the like. The position command may be generated with the higher level control device serving as the higher level controller, the external input device or the like. The position command is generated to change a pulse frequency in order to change the speed of the servo motor 127. The position command serves as a control command. The position command value output from the command unit 110 is passed through the preprocessing unit 160 and the compensation filter 150 which will be described later, and is thereafter input to the motor control unit 120.

The motor control unit 120 controls the servo motor 127 based on the command output from the command unit 110. The motor control unit 120 includes a subtractor 121, a position control unit 122, an adder 123, a subtractor 124, a speed control unit 125, an adder 126, the servo motor 127, an integrator 129, a position feedforward unit 130 and a speed feedforward unit 131. The subtractor 121, the position control unit 122, the adder 123, the subtractor 124, the speed control unit 125, the adder 126, the servo motor 127 and the integrator 129 form a position feedback loop. The subtractor 124, the speed control unit 125, the adder 126 and the servo motor 127 form a speed feedback loop. A rotary encoder 128 is attached to the servo motor 127 serving as the motor. The rotary encoder 128 and the integrator 129 serve as a detector, and the integrator 129 outputs a position detection value as position feedback information to the subtractor 121.

Although in the following description, the servo motor 127 is a motor which performs a rotary motion, the servo motor 127 may be a linear motor which performs a linear motion.

The subtractor 121 determines a difference between the position command value which has been shaped and which is output from the compensation filter 150 that will be described later and a detection position which has been subjected to position feedback, and outputs the difference as a position error to the position control unit 122.

The position control unit 122 outputs, as a speed command value, to the adder 123, a value obtained by multiplying the position error by a position gain Kp.

The adder 123 adds the speed command value and the output value (position feedforward term) of the position feedforward unit 130, and outputs, to the subtractor 124, the resulting value as the speed command value which has been subjected to feedforward control. The subtractor 124 determines a difference between the output of the adder 123 and a speed detection value which has been subjected to speed feedback, and outputs the difference as a speed error to the speed control unit 125.

The speed control unit 125 adds a value obtained by multiplying the speed error by an integral gain $K1v$ and then integrating the resulting value and a value obtained by multiplying the speed error by a proportional gain $K2v$, and outputs the resulting value as a torque command value to the adder 126. The adder 126 adds the torque command value and the output value (speed feedforward term) of the speed feedforward unit 131, and outputs the resulting value to the servo motor 127 as a torque command value which has been subjected to feedforward control. The rotation of the servo motor 127 which is controlled based on the torque command value is transmitted to the machine 200 through a transmission mechanism 300. As the transmission mechanism 300, for example, a ball screw is used.

The rotary encoder 128 detects the rotation angle position of the servo motor 127. The speed detection value based on the rotation angle position which is detected is input as speed feedback information (speed FB information) to the subtractor 124.

The integrator 129 integrates the speed detection value output from the rotary encoder 128, and outputs the position detection value. The position detection value is input as the position feedback information (position FB information) to the subtractor 121.

The position feedforward unit 130 performs, on a value obtained by differentiating the position command value output from the compensation filter 150 and then multiplying the resulting value by a constant, position feedforward processing indicated by a transmission function G(s) represented in formula (1), and outputs the result of the processing as the position feedforward term to the adder 123. Coefficients $a_i$ and $b_j$ (m, n≥i, j≥0, m and n are natural numbers) in formula (1) are coefficients in the transmission function G(s).

[Math. 1]

$$G(s) = \frac{b_0 + b_1 s + b_2 s^2 + \ldots + b_n s^n}{a_0 + a_1 s + a_2 s^2 + \ldots + a_m s^m} \tag{1}$$

The speed feedforward unit 131 performs, on a value obtained by differentiating the position command value twice and then multiplying the resulting value by a constant, speed feedforward processing indicated by a transmission function H(s) represented in formula (2), and outputs the result of the processing as the speed feedforward term to the adder 126. Coefficients $c_i$ and $d_j$ (m, n≥i, j≥0, m and n are natural numbers) in formula (2) are coefficients in the transmission function H(s). The coefficients $c_i$ and $d_j$ are second coefficients. The natural numbers m and n may be the same as or different from natural numbers m and n in formula 2.

[Math. 2]

$$H(s) = \frac{d_0 + d_1 s + d_2 s^2 + \ldots + d_n s^n}{c_0 + c_1 s + c_2 s^2 + \ldots + c_m s^m} \tag{2}$$

As described above, the motor control unit 120 is configured.

The compensation filter 150 is provided in a stage preceding the motor control unit 120, and the position command value is input thereto. The compensation filter 150 is a position command value shaping unit which shapes the position command value that is input. As the compensation filter 150, for example, an inverse characteristic filter is used which has an inverse filter characteristic of a transmission characteristic based on a two inertia model from the servo motor 127 up to the machine 200.

Here, the transmission function G(s) which indicates the transmission characteristic from the servo motor 127 up to the machine 200 is represented by formula (3) based on the two inertia model.

[Math. 3]

$$G(s) = \frac{2\zeta\omega_0 s + \omega_0^2}{s^2 + 2\zeta\omega_0 s + \omega_0^2} \tag{3}$$

where $\omega_0$ is a machine resonance frequency and $\zeta$ is a dumping factor.

Figure 2:
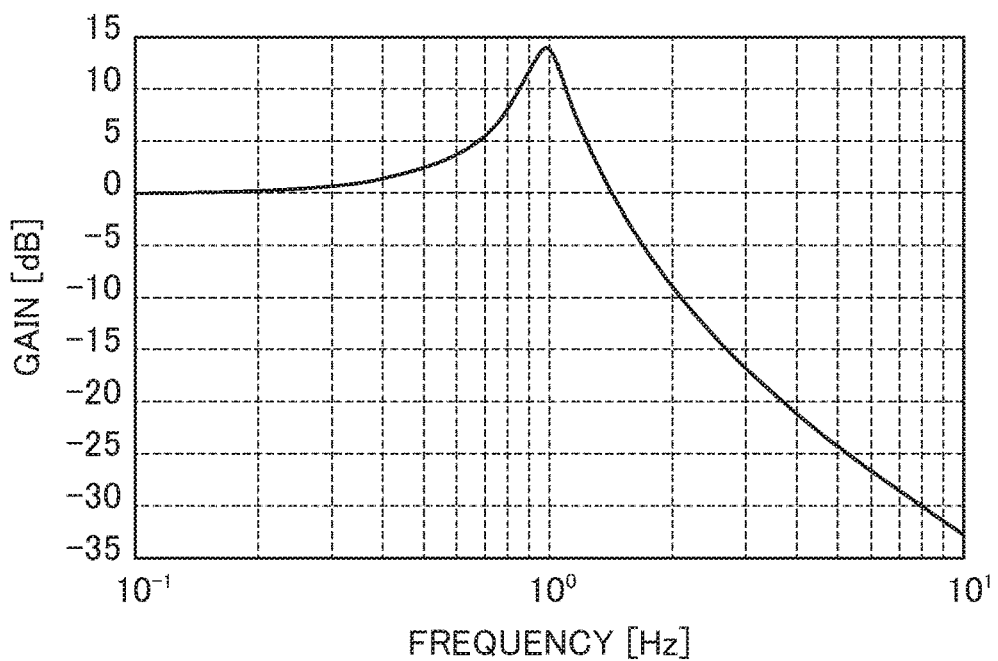
FIG. 2 is a graph showing a transmission characteristic from a servo motor up to a machine.

The transmission function G(s) is represented by a second-order low pass filter in which the resonance frequency $\omega_0$ of the machine is a cutoff frequency. As an example, a transmission characteristic when $\omega_0=1$ [Hz] and $\zeta=0.1$ is shown in FIG. 2. In FIG. 2, a horizontal axis is a frequency [Hz] and a vertical axis is a gain [dB]. It can be confirmed from FIG. 2 that the transmission characteristic from the servo motor 127 up to the machine 200 has a gain of 0 or greater [dB] around the resonance frequency $\omega_0$. Hence, vibrations in the machine system easily occur around the resonance frequency $\omega_0$. It can also be confirmed from FIG. 2 that the transmission characteristic has a feature in which the gain is lowered in a frequency region higher than the resonance frequency $\omega_0$. Hence, the machine system does not respond in a frequency region which is somewhat higher than the resonance frequency $\omega_0$.

In order to remove the problems caused by the transmission characteristic as described above, as the compensation filter 150, the inverse characteristic filter of the transmission characteristic from the servo motor 127 up to the machine 200 is used. The characteristic F (s) of the inverse characteristic filter of the transmission characteristic based on the two inertia model from the servo motor 127 up to the machine 200 is represented by formula (4) below.

[Math. 4]

$$F(s) = \frac{s^2 + 2\zeta\omega_0 s + \omega_0^2}{2\zeta\omega_0 s + \omega_0^2} \quad (4)$$

Figure 3:
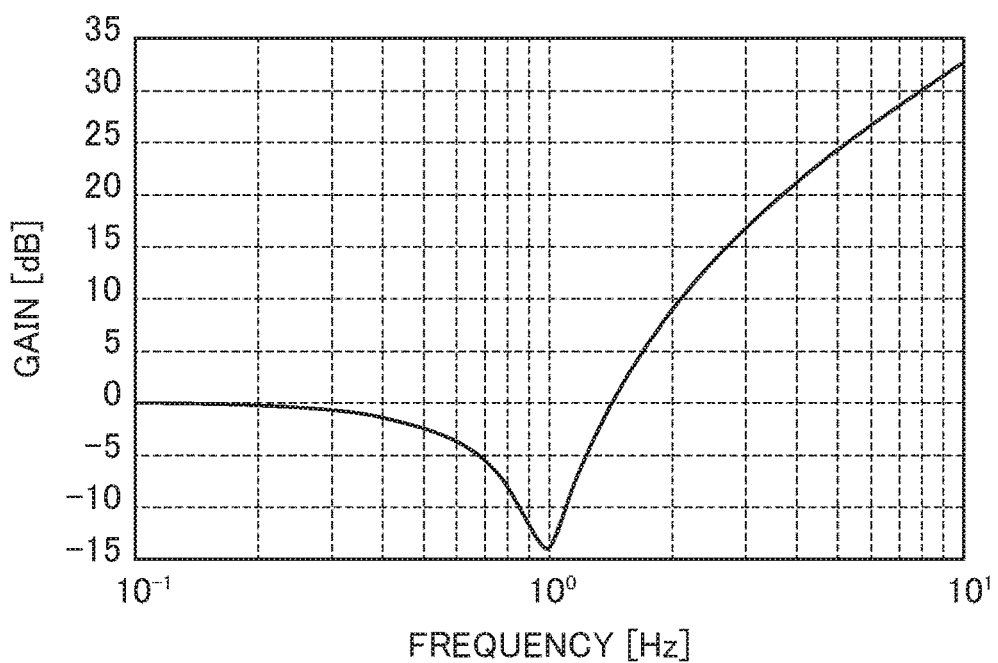
FIG. 3 is a graph showing a filter characteristic of an inverse characteristic filter.

The filter characteristic of the inverse characteristic filter is shown in FIG. 3. In FIG. 3, a horizontal axis is a frequency [Hz] and a vertical axis is a gain [dB]. As the compensation filter 150, the inverse characteristic filter as described above is used, and thus it is possible to realize position control in which a small number of residual vibrations are present around the resonance frequency $\omega_0$. It is also possible to realize the position control in which the machine system responds even in the frequency region higher than the resonance frequency $\omega_0$.

Here, the compensation filter 150 shown in FIG. 3 has a frequency region in which the gain is greater than 1. Specifically, in the frequency region higher than the resonance frequency $\omega_0$, the frequency region in which the gain is greater than 1 is present. On the other hand, even in such a frequency region, a small vibration in the command value input to the compensation filter 150 may be caused by discretization processing or the like. In such a case, the command value is compensated for with the compensation filter 150, and thus the small vibration in the command value is amplified, with the result that vibrations or an unusual sound may occur in the driven unit of the machine. Hence, in order to remove such conditions, the preprocessing unit 160 which will be described later is provided in a stage preceding the compensation filter 150.

Although the compensation filter 150 is provided outside the motor control unit 120, that is, outside the position feedback loop and the speed feedback loop, the compensation filter 150 may be provided in the position feedback loop or the speed feedback loop of the motor control unit 120 so as to compensate for various types of command values for controlling the motor. For example, after commands such as the position command, the speed command and the torque command, specifically, the compensation filter 150 may be connected to the output side of the position control unit 122, the output side of the speed control unit 125, the output side of the adder 123 or the output side of the adder 126. In front of the feedforward unit, specifically, on the input side of the position feedforward unit 130 or the input side of the speed feedforward unit 131, the compensation filter 150 may be provided. However, in order to reduce a vibration factor outside the feedback loop (the position feedback loop, the speed feedback loop) of the motor control unit 120, the compensation filter 150 is preferably provided outside the position feedback loop or the speed feedback loop. In FIG. 1, the compensation filter 150 is arranged in front of the subtractor 121 which determines the position error, and the output of the compensation filter 150 is output to the subtractor 121 and the position feedforward unit 130.

The compensation filter 150 may be another filter that has the frequency region in which the gain is greater than 1 such as a notch filter or a filter for setting an acceleration/deceleration time constant.

The preprocessing unit 160 will then be described. The preprocessing unit 160 is provided in the stage preceding the compensation filter 150. The preprocessing unit 160 executes, when a variation in the command value (position command value) before being compensated for with the compensation filter 150 is equal to or less than a predetermined value, preprocessing in which a past command value is used as a current command value.

Figure 4:
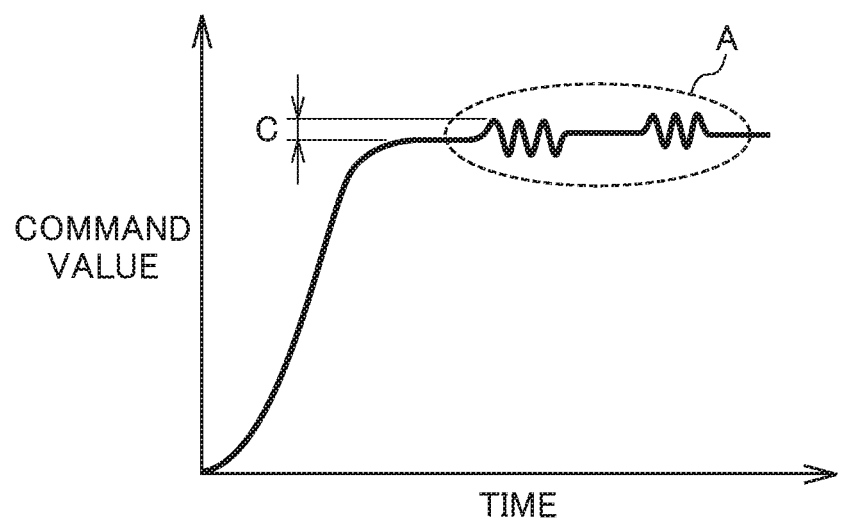
FIG. 4 is a graph showing a command value output from a command unit.

FIG. 4 is a graph showing an example of the command value output from the command unit 110, that is, the command value before being compensated for with the compensation filter 150. As indicated in a region A of FIG. 4, a small variation in the command value may be caused by discretization processing or the like.

Here, when the compensation filter 150 has a filter characteristic which raises a gain in a specific frequency region, the command value is compensated for with the compensation filter 150, and thus the small variation in the command value is amplified, with the result that vibrations or an unusual sound may occur in the driven unit of the machine.

Figure 5:
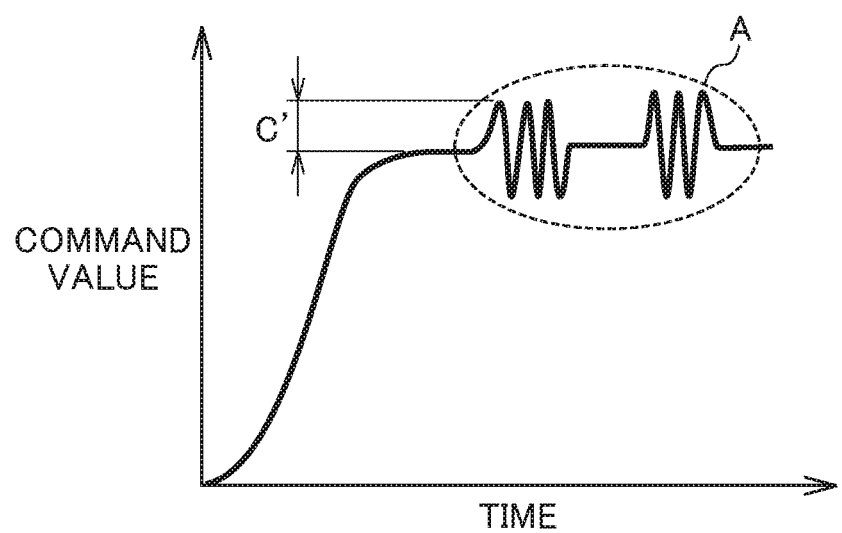
FIG. 5 is a graph showing a command value after compensation when the command value which is not subjected to preprocessing is compensated for with the inverse characteristic filter.

FIG. 5 is a graph showing an example of a command value after compensation when the command value which is not subjected to the preprocessing is compensated for with the compensation filter 150. As is found from comparison of FIG. 4 with FIG. 5, a small variation (variation amount C) in the command value indicated in the region A of FIG. 4 is amplified in the command value after the compensation indicated in the region A of FIG. 5 (variation amount C'). As described above, when the compensation filter 150 has a filter characteristic which raises a gain in a specific frequency region, if the frequency band of the command value is included in the specific frequency region, an unnecessary small variation caused by discretization processing or the like may be amplified with the compensation filter 150.

Hence, when the variation in the command value before being compensated for with the compensation filter 150 is equal to or less than the predetermined value, the preprocessing unit 160 executes the preprocessing in which the past command value is used as the current command value. Specifically, a predetermined threshold value B (unillustrated) for determining the magnitude of the variation is determined, and when the variation amount C of the command value is equal to or less than the predetermined threshold value B, the past command value is used as the current command value. In this case, the predetermined threshold value B for determining the magnitude of the variation forms a dead zone, and when the variation amount C of the command value falls within the range of the dead zone, the command value is not updated, and the past command value (for example, the previous command value) is used without being processed.

Here, the variation amount C of the command value can be determined by various methods. For example, the variation amount C of the command value may be determined based on a difference between the immediately preceding command value and the current command value. The variation amount C of the command value may be determined based on a difference between a command value which precedes the command value by a predetermined time and the current command value. The variation amount C of the command value may also be determined based on a difference between the average value of command values within a past predetermined period and the current command value.

When the variation in the command value is equal to or less than the predetermined value, as the past command value which is used as the current command value, the command value (previous command value) output by the preprocessing unit 160 immediately before, the average value of command values within the past predetermined period or the like can be used.

Figure 6:
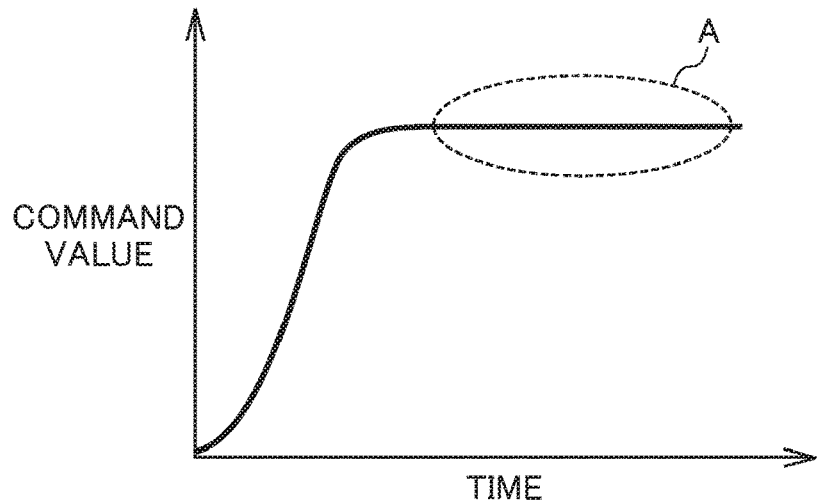
FIG. 6 is a graph showing a command value after compensation which is preprocessed and which is thereafter processed with the inverse characteristic filter.

FIG. 6 is a graph showing an example of a command value after compensation when the command value shown in FIG. 4 is preprocessed with the preprocessing unit 160 and is further compensated for with the compensation filter 150. As described above, the preprocessing is executed with the preprocessing unit 160 before the compensation is performed with the compensation filter 150, and thus even when the compensation filter 150 has a filter characteristic which raises a gain in a specific frequency region, a small variation in the command value caused by discretization processing or the like is prevented from being amplified.

When a variation in the command value before being compensated for with the compensation filter 150 is equal to or less than the predetermined value for a predetermined period, the preprocessing in which the past command value is used as the current command value may be executed. For example, when the variation in the command value is equal to or less than the predetermined value for the predetermined period, as the current command value, the average value of command values within the past predetermined period may be used. In this way, an unnecessary small variation can be determined more reliably, and thus the preprocessing in which the past command value is used as the current command value can be executed.

In the stage preceding the compensation filter 150, the preprocessing unit 160 as described above is provided, and thus even when the compensation filter 150 has a filter characteristic which raises a gain in a high frequency region or even when the compensation filter 150 has a filter characteristic which raises a gain in a low frequency region, a small variation in the command value can be prevented from being amplified. In other words, regardless of the filter characteristic of the compensation filter 150 (the frequency band which raises a gain), it is possible to prevent a small variation in the command value from being amplified. Even when the frequency band of the signal of the command value is a high frequency band or a low frequency band, it is possible to prevent a small variation in the command value from being amplified. In other words, regardless of the frequency of the signal which has a small variation, it is possible to prevent a small variation in the command value from being amplified. In other words, in the present embodiment, as compared with a case where a band pass filter such as a low pass filter is provided in the stage preceding the compensation filter 150, under a wide range of conditions, it is possible to prevent a small variation in the command value from being amplified. When a band pass filter such as a low pass filter is simply provided in the stage preceding the compensation filter 150, regardless of the state of a variation in the command value, the command value is constantly shaped. However, this type of processing can be prevented.

This configuration can also be suitably applied to a motor controller which optimizes the filter characteristic of the compensation filter 150 such as by machine learning. For example, even when in a motor controller which can change the filter characteristic of the compensation filter 150, the filter characteristic of the compensation filter 150 is changed, and thus a frequency region which raises a gain is changed, it is possible to prevent a small variation in the command value from being amplified.

Whether or not the variation in the command value is equal to or less than the predetermined value is preferably determined based on the command value before entry into the feedback loop (the position feedback loop, the speed feedback loop) of the motor control unit 120. Specifically, preferably, the command unit 110 which generates the command value or a higher level controller thereof (a higher level control device, an external input device or the like) is provided outside the feedback loop of the motor control unit 120, and determines, based on the command value before entry into the feedback loop, whether or not the variation in the command value is equal to or less than the predetermined value. Based on the result of the determination, the command unit 110 or the like determines whether or not the preprocessing is executed with the preprocessing unit 160. In this way, it is possible to reduce a vibration factor outside the feedback loop (the position feedback loop, the speed feedback loop) of the motor control unit 120.

Figure 7:
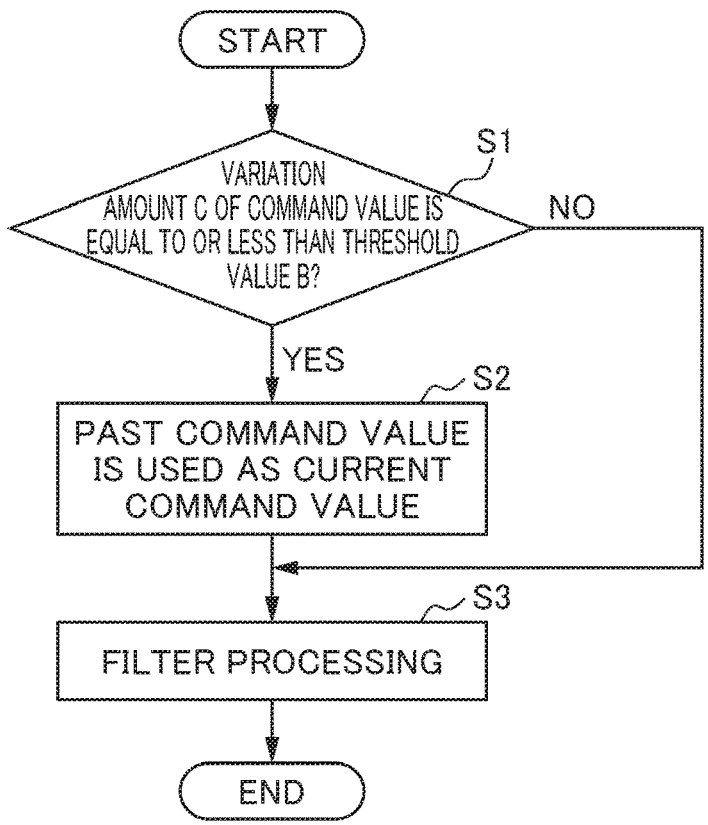
FIG. 7 is a flowchart showing processing in the embodiment of the motor controller.

The processing of the embodiment of the motor controller 100 will then be described with reference to the flowchart of FIG. 7.

In step S1, whether or not the variation amount C of the command value is equal to or less than the threshold value B is first determined. When the variation amount C of the command value is equal to or less than the threshold value B (yes in step S1), in step S2, the preprocessing unit 160 executes the preprocessing in which the past command value is used as the current command value. Then, after the execution of the preprocessing in step S2, in step S3, filter processing is executed with the compensation filter 150. On the other hand, when the variation amount C of the command value is not equal to or less than the threshold value B (no in step S), the process is transferred to step S3, and the filter processing is executed with the compensation filter 150.

The processing as described above is performed, and thus even when the compensation filter 150 which compensates for the command value has a filter characteristic that raises a gain in a specific frequency region, a small variation in the command value is prevented from being amplified, with the result that it is possible to prevent the occurrence of vibrations or an unusual sound in the driven unit.

A configuration may be adopted in which the threshold value for determining whether or not the variation in the command value is equal to or less than the predetermined value can be set by an operator. A configuration may also be adopted in which when the variation in the command value is equal to or less than the predetermined value for the predetermined period, if the preprocessing in which the past command value is used as the current command value is executed, the operator can set the predetermined period and the predetermined value. In this way, it is possible to appropriately set criteria according to the state of the controller and the like.

Each of functions included in the motor controller according to the embodiment can be realized by hardware, software or a combination thereof. Here, the realization by software means that a computer reads and executes programs so as to achieve the realization.

The programs are stored with various types of non-transitory computer readable media and can be supplied to the computer. The non-transitory computer readable media include various types of tangible storage media. Examples of the non-transitory computer readable medium include magnetic recording media (for example, a flexible disk, a magnetic tape and a hard disk drive), magneto-optical recording media (for example, a magneto-optical disk), a CD-ROM (Read Only Memory), a CD-R, a CD-R/W and semiconductor memories (for example, a mask ROM, a PROM (Programmable ROM), an EPROM (Erasable PROM), a flash ROM and a RAM). The programs may be supplied to the computer with various types of transitory computer readable media. Examples of the transitory computer readable medium include electrical signals, optical signals and electromagnetic waves. The transitory computer readable media can supply the programs to the computer through wired communication paths such as an electric wire and an optical fiber or wireless communication paths.

In other words, the motor controller of the present disclosure can take various types of embodiments which have configurations as described below.

(1) A motor controller 100 of the present disclosure includes: a command unit 110 which outputs a command value for controlling a servo motor 127 that drives a driven unit; a motor control unit 120 which controls the servo motor 127 based on the command value; a compensation filter 150 which compensates for the command value; and a preprocessing unit 160 which is provided in a stage preceding the compensation filter 150, the compensation filter 150 has a frequency region in which a gain is greater than 1 and the preprocessing unit 160 executes, when a variation in the command value before being compensated for with the compensation filter 150 is equal to or less than a predetermined value, preprocessing in which a past command value is used as a current command value. In this way, even when the compensation filter 150 which compensates for the command value has a filter characteristic that raises a gain in a specific frequency region, a small variation in the command value is prevented from being amplified, with the result that it is possible to prevent the occurrence of vibrations or an unusual sound in the driven unit.

(2) In the motor controller 100 of the present disclosure, the preprocessing unit 160 executes the preprocessing when the variation in the command value before being compensated for with the compensation filter 150 is equal to or less than the predetermined value for a predetermined period. In this way, whether the small variation is a small variation in the command value which does not need to be changed is determined more reliably, and then the preprocessing in which the past command value is used as the current command value can be executed.

(3) In the motor controller 100 of the present disclosure, the motor control unit 120 includes a feedback loop, and the command unit 110 or a higher level controller thereof determines, based on the command value before entry into the feedback loop, whether or not the variation in the command value is equal to or less than the predetermined value, and determines, based on the result of the determination, whether or not the preprocessing unit 160 executes the preprocessing. In this way, it is possible to reduce a vibration factor outside the feedback loop.

Although the embodiment of the present disclosure has been described above, the present disclosure is not limited to the embodiment described above, and various modifications and variations are possible. The effects described in the present embodiment are simply a list of the most preferred effects produced from the present disclosure, and the effects of the present disclosure are not limited to those described in the present embodiment.

EXPLANATION OF REFERENCE NUMERALS

100 motor controller
110 command unit
120 motor control unit
121 subtractor
122 position control unit
123 adder
124 subtractor
125 speed control unit
126 adder
127 servo motor (motor)
128 rotary encoder
129 integrator
130 position feedforward unit
131 speed feedforward unit
150 compensation filter
160 preprocessing unit
200 machine (driven unit)
300 transmission mechanism

What is claimed is:

1. A motor controller comprising: a processor, the processor being configured to:
   output a command value for controlling a motor that drives a driven part of a machine;
   control the motor based on the command value; and
   compensate the command value using a compensation filter that has a frequency region in which a gain is greater than one
   wherein
   the processor executes, when a variation in the command value before being compensated for with the compensation filter is equal to or less than a predetermined value for a predetermined period, preprocessing in which a past command value is used as a current command value prior to compensating the command value.

2. The motor controller according to claim 1, wherein the processor includes a feedback loop, and
   the processor or a higher level controller thereof determines, based on the command value before entry into the feedback loop, whether or not the variation in the command value is equal to or less than the predetermined value, and determines, based on a result of the determination, whether or not to execute the preprocessing.

* * * * *